Patented June 29, 1937

2,085,605

UNITED STATES PATENT OFFICE 2,085,605

THERMIONIC CATHODE FOR ELECTRIC DISCHARGE DEVICES

Henry Thomas Ramsay and Harold Percy Rooksby, Middlesex, England, assignors to General Electric Company, a corporation of New York No Drawing. Application April 30, 1935, Serial No. 19,104. In Great Britain May 11, 1934

8 Claims. (Cl. 250—27.5)

Our invention relates to thermionic cathodes for electric discharge devices. More particularly, our invention relates to thermionic cathodes suitable for use in discharge devices in which an arc-like discharge takes place.

In discharge devices containing a sufficient amount of an ionizable medium to support an arc-like discharge, it is frequently desirable to run the cathode member at extremely high temperatures to increase electron emission thus making possible the high current densities which are customary in such tubes. An additional reason for raising the temperature is the possibility of continuously reactivating the cathode to counterbalance the deactivating effects of ion bombardment. A distinct limitation, however, is imposed upon the temperature conditions under which the cathode may operate by the fact that severe thermal evaporation of the active material takes place above a certain temperature range.

It is an object of our invention to provide a thermionic cathode which may be operated at substantially higher temperatures than those of the prior art without serious loss of active substances.

An additional object is to provide a cathode which can be made to supply its own gettering material.

Further objects and advantages will be apparent upon an examination of the following specification taken in connection with the appended claims.

It has previously been proposed as theoretically feasible to increase the durability of oxide cathodes by compounding an alkaline earth metal with a relatively inert metallic oxide such as alumina. The aluminates known to the prior art, however, have not proven suitable for practical use, and are characterized by several undesirable effects, such as decreasing the emissivity of the alkaline earth material employed.

We have discovered that if an aluminate is formed containing an excessive quantity of alkaline earth metal, the disadvantages inherent in the simpler compounds of the prior art may be largely obviated. Particularly successful results have been obtained, for example, with aluminates of the apparent composition $$3XO.Al_2O_3,$$

where X is an alkaline earth metal such as barium or strontium. An aluminate of this type may be formed, as X-ray analysis shows, by heating mixtures of a suitable alkaline earth compound and a suitable aluminum compound, one or both of which contain oxygen, and in which the proportion of the alkaline earth metal is relatively high. In general, the ratio of the alkaline earth metal to the aluminum in such mixtures should be not much less than that in the compound $3XO.Al_2O_3$ (where X is the alkaline earth metal). The heating must be sufficient to produce a change in the crystalline structure of the material as indicated by X-ray analysis.

As a specific example of our method of preparing a thermionic cathode, the following steps are employed. A mixture is made containing barium carbonate, such as is obtainable commercially under the trade-name of "A. R. Reagent," and aluminum oxide finely divided in a Plauson mill, in proportions such that the ratio of the barium and alumina is approximately that of the compound $3BaO.Al_2O_3$. The mixture is heated in a suitable vessel to 1100° C. for one-half hour in air. It is then ground again to powder and heated to about 1400° C. for one-half hour in hydrogen.

If it is desired to utilize the emissive materials of our invention with a concentrated cathode, the active material may be supported on a base member comprising a metal, such as tungsten or molybdenum, having a lower vapor pressure than nickel at the expected temperature of operation of the cathode, hereinafter termed a metal of the tungsten group. The material is preferably contained in a boat or dish, rather than being coated on a wire strip, so that a large reserve may be provided and evaporation of the active material rendered innocuous. Such a boat may be filled with material prepared as above described and heated in hydrogen to about 1450° C., the temperature being maintained below the melting point of the product, which is about 1510° C. The cathode, consisting of the boat and its filling, may then be transferred in air to the discharge vessel and sealed in according to the usual practice. For best results we have found that during the last steps of exhaustion of the device the cathode should be heated to about 1200° C., although a wide range of temperatures is permissible. Mercury may then be introduced into the vessel, and the heating continued with the electric field on until the evolution of gas from the vessel has ceased, this step requiring from one-half hour to two hours' time. The cathode apparently becomes activated early in this process and remains so, that latter part being required only to free the electrodes from gas.

We have also found that a cathode of this type may be made to supply its own getter if a few per cent of metallic aluminum is mixed with the powdered material before it is embodied in a cathode. When such a cathode body is heated during the process of activation, barium, or the corresponding element, will be evolved and deposited on the walls of the vessel where it acts as a very efficient clean-up substance. While we do not wish to be bound to any special theory in explanation of this result, it is believed that the evolution of the alkaline earth metal is accomplished by the reduction of part of the "tri-aluminate" to "mono-aluminate" according to some such reaction as the following:—

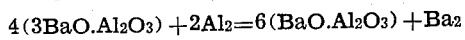

$$4(3BaO.Al_2O_3) + 2Al_2 = 6(BaO.Al_2O_3) + Ba_2$$

The aluminate, $BaO.Al_2O_3$, produced is relatively inefficient as the cathode, as has been stated, but if the tri-aluminate is in sufficient excess, that part of it which remains will act as the electron emitter.

Cathodes made in accordance with our invention have been operated successfully at very high temperatures without serious thermal evaporation being observed. Furthermore, emission densities greatly in excess of 1 ampere per square centimeter have been realized, making these cathodes eminently satisfactory for use in high current discharge tubes, such as gaseous electric discharge lamps, or rectifiers.

While we have described our invention in connection with particularly named compounds, it will be understood that many equivalent modifications will be apparent to those skilled in the art, and it is intended to include all such modifications within the scope of the appended claims.

What we claim as new and desire to secure by Letters Patent of the United States, is:—

1. A thermionic cathode containing an aluminate of a highly electron emissive alkaline earth metal, said alkaline earth metal being present in quantities in excess of the quantity thereof present in the composition $XO.Al_2O_3$, where X is the alkaline earth metal.

2. A thermionic cathode containing an alkaline earth metal aluminate of the approximate composition $3XO.Al_2O_3$, where X is the alkaline earth metal.

3. A thermionic cathode containing an aluminate of barium of the approximate composition $3BaO.Al_2O_3$.

4. A thermionic cathode comprising a base metal of the tungsten group and an activating material containing an aluminate of the approximate composition $3XO.Al_2O_3$, where X is an alkaline earth metal.

5. A thermionic cathode comprising molybdenum as a base metal and an activating material of the approximate composition $3BaO.Al_2O_3$.

6. A thermionic cathode body containing an aluminate of the approximate composition $3XO.Al_2O_3$, where X is an alkaline earth metal, and a few per cent of metallic aluminum.

7. The method of manufacturing a thermionic cathode which comprises the steps of mixing an alkaline earth metal compound and an aluminium compound, one or both of which contain oxygen, heating said mixture to a temperature of approximately 100° C. for approximately one-half hour in air, pulverizing the material, and then heating said material to a temperature of about 1400° C. for approximately one-half hour in hydrogen.

8. The method of manufacturing a thermionic cathode for an electric discharge device which comprises the steps of mixing an alkaline earth metal compound and an aluminium compound, one or both of which contain oxygen, heating said mixture to a temperature of approximately 100° C. for approximately one-half hour in air, pulverizing the material, heating said material to a temperature of about 1400° C. for approximately one-half hour in hydrogen, placing said material in a vessel consisting of a metal of the tungsten group, heating said vessel and said material to a temperature of about 1450° C. in hydrogen, mounting said vessel and said material in the container of said discharge device and then evacuating said container while heating said vessel and said material to a temperature of approximately 1200° C. until these elements are free from gas.

HENRY THOMAS RAMSAY.
HAROLD PERCY ROOKSBY.